Figure 1:
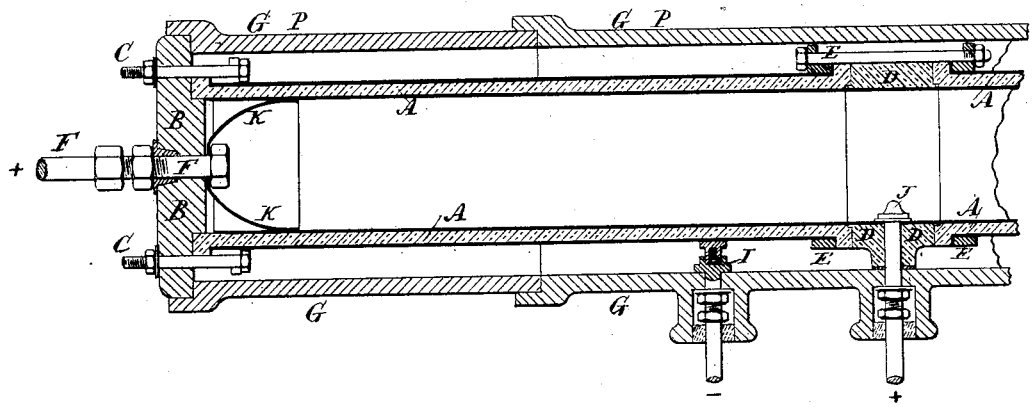

E. U. PAROD.
Electrical Conductor.

No. 225,861. Patented Mar. 23, 1880.

Witnesses
Emile Barrault
Aug. Vinck

Inventor
E. U. Parod

UNITED STATES PATENT OFFICE.

ERNEST U. PAROD, OF PARIS, FRANCE.

ELECTRICAL CONDUCTOR.

SPECIFICATION forming part of Letters Patent No. 225,861, dated March 23, 1880.

Applicaton filed January 5, 1880. Patented in England, November 19, 1878.

*To all whom it may concern:*

Be it known that I, ERNEST ULYSSE PAROD, of Paris, France, have invented a new and useful Improvement in the Transferring of Electricity to Great Distances, and in the distribution of it on its route, of which improvement the following is a specification.

The invention has for its object the transfer and distribution of electricity in large quantities over long distances irrespective of the mode of production or generation of the current or the use to which it is to be put, whatever these may be; and it consists in, first, the use of conducting-bodies arranged on opposite sides of an insulating-plate and constituting the armatures of a condenser for effecting the transfer and distribution of electricity; second, the use and application of brushes or points separated from the main conductor or piece forming a prolongation thereof by an interval and of adjusting devices for regulating the tapping or taking off of the electricity in transferring and distributing the same, whether the conductors or points are caused to be connected with and receive their electricity from a supply stored in condensers or a supply traversing wires, cables, or other ordinary or suitable electrical apparatus; third, the employment of a vacuum more or less complete to regulate the tapping or discharge of the electric fluid by the piece which receives the electrical power from the main condenser or source of supply, or the device to which the electricity is delivered from said first-named piece; and, fourth, the construction and combination of parts as hereinafter more fully set forth.

The impossibility heretofore existing of transmitting electricity to great distances, and its distribution by wires, cables, or ordinary conductors, is due, according to my experience, to the inequality of tension of the fluid upon the cables, a tension which diminishes in proproportion as the distance from the source of electricity increases. I have therefore sought for conductors which will keep the fluid at a uniform tension—a condition indispensable in effecting at the same time the distribution at a large number of different points. To this end I have given to the conductors large extent of surface; and as the armatures of a condenser are the only surfaces possessing the property of having a uniform tension upon all their points, I have disposed conducting-surfaces on both sides of an insulating-plate, and thus made them constitute the armature of an immense condenser extending from end to end of the line to be served.

The invention, therefore, comprises the transfer and distribution of electricity from a point where it can be advantageously generated or produced to places where it is to be utilized by means of an immense condenser extending between these points, which serves as a conduit instead of the wires and cables such as used in telegraphy heretofore employed.

I would here observe that although it has been desired to assimilate submarine or trans-atlantic cables to condensers, an assimilation which, however, is by no means perfectly exact, there is this essential difference between these cables and the condensers employed by me as conductors, in that the former possess the property of condensation only, in spite of the constructor, or without any design on his part; and, moreover, since these cables begin to operate as conductors of a current, so as to accomplish the intended result only after being charged as condensers and the complete loss of the charge, they have served merely to transmit signals by electricity, and not to transport or transfer the electricity itself in large quantities, as I do with my condenser-conductors. These last, then, constitute a new application and an invention first made by me.

The condenser, into which one or more electric generators of ordinary or suitable construction store, as into a reservoir of fluid, electricity at a uniform tension at all points, can be charged at one point or at several along its route, and throughout its length it will deliver the stored-up electricity by so many discharging-points as shall be necessary. It can therefore be made to serve as a unitary source of electricity for all kinds of use—telegraphy, galvanoplasty, electro-chemistry, electric illumination, and production of electro-magnetic power for motors; and I consider as specially useful its application to the transmission to a distance of motive power for special works.

This system of canalization, so to say, of electricity permits the employment for the production of electricity of the quasi-gratuitous forces of nature, as of falls and watercourses, which it is possible to intercept in their course, of the wind, and even of the flux and reflux of the sea, which can thus be made to take the place of steam-engines of costly construction ordinarily used for the production, in cities, of electricity.

The remote situation of most of these natural forces has heretofore rendered their utilization impossible; but by applying them to operate dynamo-electric machines for charging a condenser-conductor all of them can be utilized so as to produce at a distance light, heat, or electro-magnetic force without sensible loss. This method therefore will, in effect, displace these forces themselves from the locality where they are found and transmit them to places where they can be made use of, so that the enormous mechanical power now lost can be secured.

The condenser-conductor is susceptible of forms and dispositions varying almost indefinitely, as are also the armatures, which can be constituted by sheets of any metal, by a liquid, by the natural humidity of the soil alone, or by the water of a river or of the sea in contact with one of the sides of the insulating-plate. The nature of the dielectric employed as the insulating or isolating medium can also be varied, and I therefore reserve the right to employ, according to the case, such disposition of the condenser as seems advantageous for the transfer of the electricity.

This invention comprises also the doubling of each of the armatures ordinarily employed in the construction of condensers by a second armature in intimate contact with the first, and formed of a good mediocre or bad conducting material. It may be of a liquid, as water, pure or saturated with salt, or resin, pure or mixed with iron filings or turnings, or of other suitable substance. This second armature, charged or saturated with electricity throughout its mass by the fluid arriving by the metallic armature, restores at the proper time the fluid stored up, so that it acts as a veritable regulator of electricity, and increases considerably the capacity of the condenser. The same result can be obtained by doubling one only of the primitive armatures.

Figure 2:
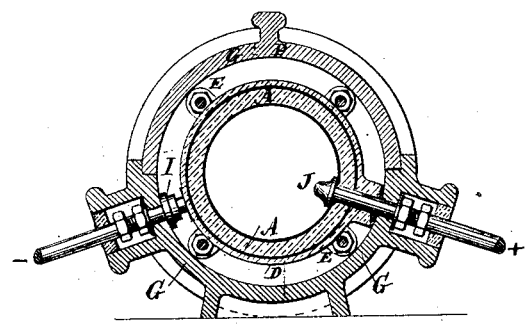
Figure 3:
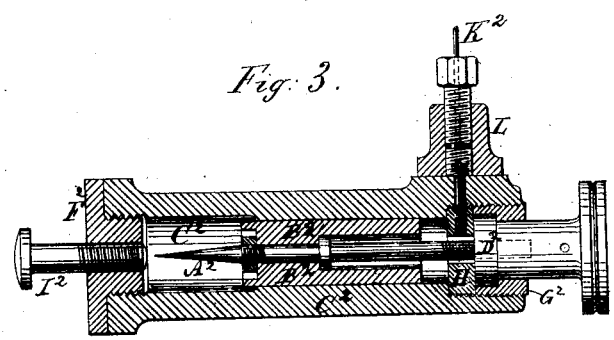

Figures 1 and 2 of the accompanying drawings, which form a part of this specification, represent, in longitudinal and cross sections, a disposition of condenser-conductor in accordance with this invention. Fig. 3 represents, in longitudinal section, an apparatus for tapping the electricity.

Referring to Figs. 1 and 2, A A is a cylinder of insulating material, of a thickness greater or less, according to the tension which it is wished to maintain in the condenser-conductor. This cylinder is formed of sections joined together by connecting pieces or sleeves D D, held in place by clamps E E. The joints between the sections and the sleeves are made with a rubber washer, so that they are perfectly sealed. The cylinder A A, which extends from end to end of the line, is closed at its extremities by a head, B, of insulating material, held by clamps C, and joined hermetically at the edge of the cylinder.

The interior and exterior of the cylinder A and of the sleeves D, forming the condenser proper, are covered with metallic armatures, the interior armatures of each of the sections and sleeves being united together by a small band of metal placed over the edge of the rubber washer, so as to avoid all interruption of the continuity of the armature. The exterior armatures of the same sections are joined by the bolts and clamps E E.

G is a second cylinder of insulating material, either simply of baked earthenware or of other suitable material, which serves as an envelope to the condenser A. This envelope is joined to the head B in such manner as to form about the condenser a vacant space, in which there should be no circulation of air, and at the bottom of which are placed pieces of quicklime to render perfectly dry the imprisoned air, and thus to avoid dissipation of the electric fluid.

The electricity is charged into the condenser by the bolt F, connected with the positive or with the negative pole, if desired, of the generator, and by a copper cap, K, with the interior armature, and the second pole of the generator of electricity is connected with the exterior armature by the bolts and clamps C.

The exterior armature is put in communication with the wires, conductors, or coils of the apparatus to be operated or affected by means of bolts such as represented by I, of which bolts the head forms a contact-piece, and is held by a spring against the armature, and the interior armature is put in communication with the wires, conductors, or coils by bolts, as indicated by J, of which the head bears against the armature, which bolts pass through the connecting-sleeves D and the envelope G, and serve to maintain the condenser in the middle of the envelope.

The bolts I and J from both armatures pass through tubular openings or chambers formed in the body of the envelope G, and these tubular openings are closed by a stopper coated with green lac or resin, through which stopper the wires or conductors pass for taking off the electricity by means of the bolts I and J. It will be, of course, understood that there are as many pairs of bolts I and J as there are points of discharge for the electricity.

The cylindrical envelope G is also constructed in sections which abut one against the other, and are cemented so as to be sealed. The lower part of the envelope carries the tubular openings, and it is provided with a sort of depression, or with ridges, to insure the stability of the whole. The upper part, P, can be lifted like a box-lid, to permit the establishment and verification of the discharging devices.

To facilitate the construction of the condenser-conductor, the cylindrical condenser can be replaced by a sort of trough of insulating material, covered inside and outside with a metallic armature, and disposed in its envelope in the same manner as the cylindrical condenser.

The discharging-pieces are made in the same manner as in other dispositions of condensers, and the assemblage of the sections is effected in a manner analogous to that before described, or by other efficient means.

From the foregoing description it will be understood that the fluid charged into the condenser by the electric generator or generators distributes itself throughout the length of the condenser at a uniform tension, which increases as new quantities are furnished, and until it is equal to that of the fluid generated. It will be understood, also, that to obtain the desired tension in the condenser it suffices to maintain the number and power of the generators in proportion to the number and importance of the demands to be supplied.

The tension of the fluid can be readily regulated to the desired degree by disposing over the armature two balls capable of causing an electric discharge, the position of which can be regulated, and they can be kept at the required distance apart, so that the discharge is effected between them whenever, for one cause or another, the maximum tension in the condenser, which is that corresponding to the most intense electrical effect to be produced, is exceeded.

The discharge or taking off of the fluid from the condenser is effected in several ways, according to the quantities of electricity required and the nature of the effects to be produced. I employ in particular, besides the wires of different metals, wires or cables of every kind, even those made of substances of mediocre or bad electric conductivity, such as wood, flax, cotton, &c., and also materials infusible, incombustible, and bad conductors of heat. The said materials can be employed in a pure state or mixed or impregnated with substances of such nature as to keep constant the degree of conductivity.

I employ as an intermediary between the condenser-armatures and the metallic wires of the apparatus to be influenced one or the other of the materials specified, covered or not, according to the case, with an insulating-envelope of caoutchouc, gutta-percha, glass, porcelain, &c.

I employ, also, tubes of vulcanized rubber, or of other insulating material, filled with liquids having the desired degree of conductivity. These tubes are of an interior diameter suited to the conductivity of the liquid, and at their ends a metal or other wire of a diameter equal to the interior diameter of the tube is introduced thereinto, and puts the conducting liquid in communication with one of the armatures of the condenser and with one of the poles of the apparatus to be influenced.

Finally, I tap the electricity of the condenser-conductor by means of one or several points, blunted or rounded, for each of the discharging devices resting against the armatures.

The power of points to carry off electricity is well known. The present invention with relation thereto consists in the application to the division and distribution of electricity so as to effect the subdivision of the current. One of the dispositions adopted for the purpose is indicated in Fig. 3.

A metallic point, $A^2$, guided by a cylinder, $B^2$, which is free to slide in a chamber, $C^2$, and upon which the point is fixed, is advanced and withdrawn by the aid of a screw engaging in a nut or female screw, D, provided with an operating piece of ebonite or other insulating material. The point $A^2$ can thus at will be moved toward or withdrawn from the influencing-piece $I^2$, which, according to the disposition of the condenser, can be one of the bolts I or J in Figs. 1 and 2, or the wire which passes through the corresponding tubular openings, and form a prolongation of the armature.

The piece $F^2$ is screwed into the chamber $C^2$, which is of insulating material, as is the whole body of the apparatus.

The nut $D^2$ is held loosely between the retaining-nut $G^2$ and an annular piece, H, of copper, which is retained in position by a copper screw, of which the head screws into the projection L, in the screw cut in the axis of which the wire K, for taking off the electricity, is placed and held in contact with the head of the aforesaid screw.

By this disposition the fluid tapped by means of the point $A^2$ and the influencing-piece $I^2$ passes by the wire K without interfering with the regulation at will of the distance of the point $A^2$ from said piece $I^2$ to vary the quantity of fluid taken off.

The electricity of the condenser-conductor may be carried off in this manner by placing a point like that just described at the end of one poll only of the apparatus to be operated or influenced and putting the other pole into immediate contact with the second armature. Such a point may—and so I propose to employ it—be used for each of the poles, and thus the discharging apparatus will be entirely isolated from the condenser. To avoid too great a flow of fluid by a single point a greater or less number of these points fixed on the same metallic piece may be disposed in a manner analogous to the single point, as shown in Fig. 3, so as to reduce as much as is desirable the intensity of the current passing by each of these points.

The influencing-piece, which forms a prolongation of the armature and acts upon the point or points, can be flat, round, or pointed, or can be formed by a support provided with discharging-points suitably disposed with reference to those for tapping off the current. The position of the points with reference to the armature or the influencing-piece can also be changed—that is to say, the points may be fixed on the side of the armature and the flat piece or other device on the side of the apparatus. Moreover, two metallic plates of the same size, placed opposite each other in parallel planes, and adjustable like the points, may be used instead of the latter.

The chamber in which are the said points or plates for tapping or discharging the electricity is preferably arranged so that a vacuum more or less perfect can be made therein, and the flow of electrical current passing from the influencing-piece to the piece influenced be thus regulated, and oxidation be prevented as well.

It is readily seen that the use of points permits the absolute isolation from the condenser-conductor of the apparatus to be operated or influenced, and of its supply-wires, and also that there is no derivation, properly called, but a tapping at a distance of the fluid. In fine, this plan permits the transformation of electricity from a static condition in the condenser into dynamic currents of a certain tension. This disposition, as well as the use of bad and mediocre conductors of electricity and heat, has the effect of preventing any instantaneous discharge of the condenser or other casual augmentation of the intensity of the current, and consequently obviates all chance of accident.

The armatures of the condenser may be connected with the influencing-plate by means of a body which is a mediocre or bad conductor, such as before mentioned, and the use of wires or conductors of good, mediocre, or bad conductivity may be combined with the use of points or brushes, or the two means may be used separately.

The modes described of tapping the electric fluid, not being dependent for their action upon the conductivity of the conductors employed, are consequently suited to insure the indefinite division of electricity and its distribution over a determined route whether a condenser be provided or the electricity exists as a current in ordinary wires or cables; and I expressly intend to cover the application of these means for distribution along public ways and in buildings and private establishments of electricity for all uses as well with a condenser-conductor of any suitable system as with plain wires, cables, or other ordinary or suitable conductors.

In order the better to deliver the electricity small condenser-conductors may be united with the principal condenser, forming horizontal or vertical conduits inside of the establishments or places to be served.

The different pieces of the condensers, tapping devices, armatures, bolts, discharging-points, &c., may be gilded, silvered, platinized, or nickled to prevent their oxidation.

Having thus fully described my said invention, and the manner in which the same is or may be carried into effect, what I claim, and desire to secure by Letters Patent, is—

1. The method of transferring electricity by storing or charging the electricity into the conducting-bodies located on opposite sides of an insulating-plate and constituting the armatures of an immense condenser, the said armatures being arranged substantially as described, so that they influence each other and act to maintain the uniformity of tension along the line, as set forth.

2. In the delivery and distribution of electricity, the method of regulating the tapping or taking off of the electricity by brushes or points separated from the piece forming a prolongation of the main conductor or storehouse of electricity by an interval, substantially as described.

3. The method of regulating the tapping or outflow of electricity by means of a vacuum, substantially as described.

4. The method of transferring and distributing electricity, consisting in charging the electricity into conducting-bodies located on opposite sides of an insulating-plate, so proportioned and arranged that they influence each other and act to maintain uniformity of tension on the line, thus constituting the armatures of a condenser, tapping the electricity stored up at the proper points, and regulating the amount of electricity taken off at different points by means substantially as described.

5. In a system involving the transfer of electricity, a condenser-conductor consisting of conducting-bodies separated by an insulating-plate proportioned and arranged as described, so that they influence the electrical condition of each other and act to maintain uniformity of tension, as set forth.

6. A condenser-conductor having the insulating-plate between the armatures formed in sections and secured together, and provided with armatures of conducting material located on opposite sides of said plate, and also formed in sections, the sections of each armature on the same side of the plate being connected with each other, substantially as described.

7. The combination, with the condenser-conductor and its armatures, of the bolts for taking off the electricity, substantially as described.

8. In a system involving the transfer of electricity, the condenser-conductor consisting of an exterior and interior hollow armature of metal and an insulating-plate separating said armatures and the exterior insulating-envelope, substantially as described.

9. The combination of the condenser-conductor of an hermetically-closed insulating-envelope separated from said condenser by an air-space, substantially as described.

10. The combination, with the condenser-conductor and its hollow interior armature, of the head of insulating material, the cap in contact with the interior armature, and a bolt or conductor connected with said cap and passing through said insulating-head, substantially as described.

11. The combination, with a conductor of electricity or device forming a prolongation of such conductor, of a point or plate adjustable to regulate the quantity of electricity taken off from said conductor or prolongation thereof, substantially as described.

12. The combination of a case or chamber of insulating material, a point guided in said case or chamber, and means, substantially as described, for adjusting the position of said point without breaking the electrical connection with said point of a conductor outside of the case or chamber, as set forth.

13. The combination of a main conductor with distributing-conductors formed in whole or in part of materials of mediocre or bad conductivity, substantially as described.

14. A system for the transfer and distribution of electricity, consisting of a condenser-conductor composed of an insulating-plate and conducting-bodies located on opposite sides of said plates, and constituting the armatures of the condenser, a number of discharging devices, and means, substantially as described, for regulating the discharge, as set forth.

In testimony whereof I have signed my name to this specification before two subscribing witnesses.

E. U. PAROD.

Witnesses:
EMILE BARRAULT,
AUG. VINCK.